(12) United States Patent
Kennedy

(10) Patent No.: US 7,426,554 B2
(45) Date of Patent: Sep. 16, 2008

(54) SYSTEM AND METHOD FOR DETERMINING AVAILABILITY OF AN ARBITRARY NETWORK CONFIGURATION

(75) Inventor: John G. Kennedy, Longmont, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 1490 days.

(21) Appl. No.: 10/092,170

(22) Filed: Mar. 6, 2002

(65) Prior Publication Data

US 2003/0172150 A1 Sep. 11, 2003

(51) Int. Cl.
*G06F 15/173* (2006.01)
*G06F 11/00* (2006.01)
(52) U.S. Cl. ............................ 709/223; 714/100
(58) Field of Classification Search ............... 709/224
See application file for complete search history.

(56) References Cited

U.S. PATENT DOCUMENTS

| 5,901,208 A | 5/1999 | Jabbarnezhad |
| 5,913,035 A | 6/1999 | Waters et al. |
| 5,930,333 A | 7/1999 | Jabbarnezhad |
| 2002/0019870 A1* | 2/2002 | Chirashnya et al. ......... 709/224 |
| 2003/0048782 A1* | 3/2003 | Rogers et al. ............... 370/389 |
| 2003/0051049 A1* | 3/2003 | Noy et al. .................... 709/238 |

OTHER PUBLICATIONS

"Comparison of Reliability-Availability Mission Simulators," Reid Willis, Society of Reliability Engineers, printed from the web on Jan. 16, 2002, 8 pages.
"New Tools for Systems Management," Sun Microsystems, Inc., 1994-2002, 5 pages.

* cited by examiner

*Primary Examiner*—Jason Cardone
*Assistant Examiner*—Tanim Hossain
(74) *Attorney, Agent, or Firm*—Robert C. Kowert; Meyertons, Hood, Kivlin, Kowert & Goetzel, P.C.

(57) ABSTRACT

A method of operating a network system may involve receiving data indicating a configuration of components that are included in the network system, detecting a failure of one of the components, computing an availability (e.g., by calculating the instantaneous availability) of the network system from the data in response to detecting the failure, and storing data indicative of the availability of the network system.

40 Claims, 9 Drawing Sheets

$$P_{3x3} = \begin{vmatrix} \lambda_{00} & \lambda_{01} & \lambda_{01} \\ \lambda_{10} & \lambda_{11} & \lambda_{12} \\ \lambda_{20} & \lambda_{21} & \lambda_{22} \end{vmatrix}$$

$$E_0 = \frac{1 - \lambda_{11} + \lambda_{01}}{(1 - \lambda_{00})(1 - \lambda_{11}) - \lambda_{01}\lambda_{01}}$$

$$E_0 = \frac{E_0}{E_0 + MDT}$$

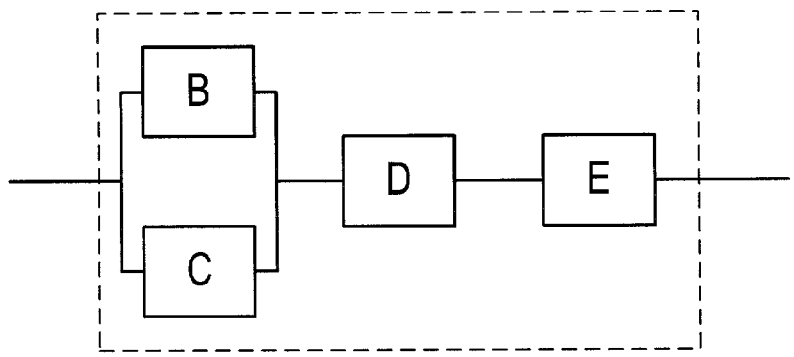
FIG. 5A
$$A_s = \prod_{i=1}^{N} A_i$$
FIG. 5B
$$A_s = \sum_{i=K}^{N} \frac{N!}{i!(N-i)!} \cdot A_i (1-A_i)^{N-1}$$
FIG. 5C
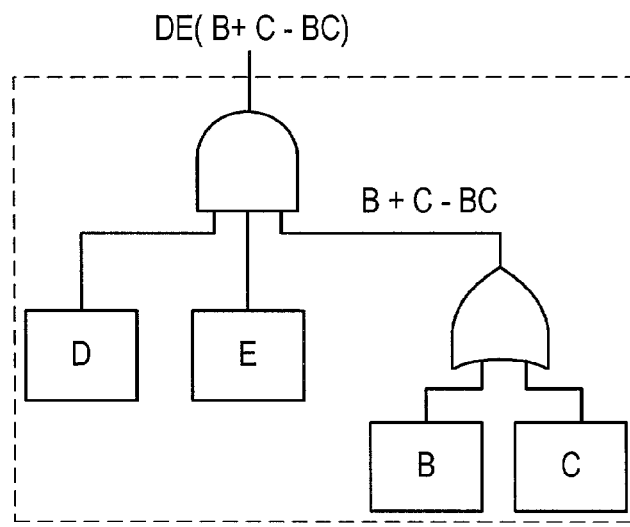
FIG. 5D

| Field Replaceable Unit | Failure Rate per $10^6$ hours | Quantity | # Failures to disrupt system |
|---|---|---|---|
| Midplane | 10.0000 | 1 | 1 |
| Power Supply | 33.0000 | 2 | 2 |
| Controller | 18.0000 | 1 | 1 |
| Loop Card | 2.0000 | 2 | 2 |
| Disk Drive | 20.0000 | 9 | 2 |

$$A = \frac{1}{1 + (\text{failure rate} * \text{MTTR})}$$

$$A_{midplane} = \frac{1}{1 + (10 \times 10^{-6} * 0.5)} = 0.99999500$$

| Field Replaceable Unit | Unit Availability |
|---|---|
| Midplane | 0.99999500 |
| Power Supply | 0.99998350 |
| Controller | 0.99999100 |
| Loop Card | 0.99999900 |
| Disk Drive | 0.99999000 |

*FIG. 6E*

$$A_2 = \sum_{i=1}^{2} \frac{2!}{i!(2-i)!} \cdot (0.99998350)^i (1-0.99998350)^{2-i} = 1.00000000$$

*FIG. 6F*

$$A_2 = \sum_{i=1}^{1} \frac{1}{1!(1-1)!} \cdot (0.99998350)^1 (1-0.99998350)^1 = 0.9999835$$

*FIG. 6G*

| Unit/Group | Availability | | |
|---|---|---|---|
| | After 0 failures | After 1 failure | After 2 failures |
| Midplane 1 | 0.99999500 | 0.00000000 | - |
| Power Supplies 2 | 1.00000000 | 0.99998350 | 0.00000000 |
| Controller 3 | 0.99999100 | 0.00000000 | - |
| Loop Cards 4 | 1.00000000 | 0.99999900 | 0.00000000 |
| Disk Array 5 | 1.00000000 | 0.99999200 | 0.00000000 |

| Failures | System Availability |
|---|---|
| Midplane | 0.00000000 |
| One Power Supply | 0.99996950 |
| Both Power Supplies | 0.00000000 |
| Controller | 0.00000000 |
| One Loop Card | 0.99998500 |
| Both Loop Cards | 0.00000000 |
| Single Disk Drive | 0.99997800 |
| Two Disk Drives | 0.00000000 |
| One Power Supply & One Loop Card | 0.99996850 |
| One Power Supply & One Disk Drive | 0.99999150 |
| One Loop Card & One Disk Drive | 0.99997700 |
| One Power Supply, One Loop Card, & One Disk Drive | 0.99998500 |

FIG. 6K

$$P(f) = 1 - e^{-\lambda t}$$

FIG. 6L

$$\lambda = \frac{1 - A_S}{A_S * MTTR}$$

FIG. 6M

| Probability of System Failure During Exposure Time |||||||| 
|---|---|---|---|---|---|---|---|
| Failed Unit(s) | Exposure Time (hours) |||||||
| | 2 | 4 | 6 | 12 | 24 | 168 | 672 |
| Power Supply | 0.0001 | 0.0002 | 0.0004 | 0.0007 | 0.0015 | 0.0102 | 0.0402 |
| Loop Card | 0.0001 | 0.0001 | 0.0002 | 0.0004 | 0.0007 | 0.0050 | 0.0200 |
| Disk Drive | 0.0001 | 0.0002 | 0.0003 | 0.0005 | 0.0011 | 0.0074 | 0.0291 |
| Power Supply & Loop Card | 0.0001 | 0.0003 | 0.0004 | 0.0008 | 0.0015 | 0.0105 | 0.0415 |
| Power Supply & Disk Drive | 0.0002 | 0.0003 | 0.0005 | 0.0009 | 0.0018 | 0.0129 | 0.0504 |
| Loop Card & Disk Drive | 0.0001 | 0.0002 | 0.0003 | 0.0006 | 0.0011 | 0.0077 | 0.0304 |
| Power Supply, Loop Card, & Disk Drive | 0.0002 | 0.0003 | 0.0005 | 0.0009 | 0.0019 | 0.0132 | 0.0517 |

FIG. 6N

$$ExpectedNumberofFailures = \lambda * t * population$$

FIG. 6P

| Expected System Failures During Exposure Time per 1000 Systems |||||||| 
|---|---|---|---|---|---|---|---|
| Failed Unit(s) | Exposure Time (hours) |||||||
| | 2 | 4 | 6 | 12 | 24 | 168 | 672 |
| Power Supply | 0.12 | 0.24 | 0.37 | 0.71 | 1.46 | 10.24 | 40.99 |
| Loop Card | 0.06 | 0.12 | 0.18 | 0.36 | 0.72 | 5.04 | 20.16 |
| Disk Drive | 0.09 | 0.18 | 0.26 | 0.53 | 1.06 | 7.39 | 29.57 |
| Power Supply & Loop Card | 0.13 | 0.25 | 0.38 | 0.76 | 1.51 | 10.58 | 43.34 |
| Power Supply & Disk Drive | 0.15 | 0.31 | 0.46 | 0.92 | 1.85 | 12.94 | 51.74 |
| Loop Card & Disk Drive | 0.09 | 0.18 | 0.28 | 0.55 | 1.10 | 7.73 | 30.91 |
| Power Supply, Loop Card, & Disk Drive | 0.16 | 0.32 | 0.47 | 0.95 | 1.90 | 13.27 | 53.09 |

FIG. 6Q

SYSTEM AND METHOD FOR DETERMINING AVAILABILITY OF AN ARBITRARY NETWORK CONFIGURATION

BACKGROUND OF THE INVENTION

1. Field of the Invention

This invention relates to network systems and, more particular, to determining availability in a network system.

2. Description of the Related Art

Individual computers are commonly coupled to form a computer network. Computer networks may be interconnected according to various topologies. For example, several computers may each be connected to a single bus, they may be connected to adjacent computers to form a ring, or they may be connected to a central hub to form a star configuration. These networks may themselves serve as nodes in a larger network. While the individual computers in the network are no more powerful than they were when they stood alone, they can share the capabilities of the computers with which they are connected. The individual computers therefore have access to more information and more resources than standalone systems. Computer networks can therefore be a very powerful tool for business, research, or other applications.

Computer applications are becoming increasingly data intensive. Consequently, the demand placed on networks due to the increasing amounts of data being transferred has increased dramatically. In order to better manage the needs of these data-centric networks, a variety of forms of computer networks have been developed. One form of computer network is a SAN (Storage Area Network). SANs connect more than one storage devices to one or more servers, using a high speed interconnect, such as Fibre Channel. Unlike in a LAN (Local Area Network), the bulk of storage in a SAN is moved off the server and onto independent storage devices which are connected to the high speed network. Servers access these storage devices through this high speed network.

The management of a computer network is often a complex and challenging task. Consequently, management tools are required to help network managers decide how best to allocate time and resources in order to minimize potential sources of network downtime. A reliable, valid measure of network availability can be a valuable tool in managing computer networks.

Various availability analysis techniques have been developed in order to predict failure probabilities for computer networks. One availability analysis technique is to monitor the performance of one or more components. If a component's performance drops below a certain threshold, a service technician may be called out to repair or replace the component that is not performing adequately. Other availability analysis techniques are used during system design in order to determine what system components and what system configurations will provide a desired level of system performance. These techniques typically involve simulating a proposed design and analyzing the availability of the proposed design under different circumstances. Similar simulation tools may be used when determining how many local spares of certain components should be kept in stock for a particular system.

SUMMARY

Various embodiments of a method and system for determining the availability of a network system are disclosed. A system may include a host computer system and a network system that includes multiple components. In one embodiment, the host computer system may be configured to: receive data indicating the configuration of components included in a network system; receive an indication of a failure of one of the components in the network system; compute an availability of a network system from the data in response to the failure of the one of the components; and store data indicative of the availability of the network system. The host computer system may also be configured to use the availability of the network system to calculate a risk of the network system being disrupted during one or more exposure periods. Note that in other embodiments, other components of the network system (e.g., array controllers, network switches, etc.) may be configured to receive data indicating the configuration of components in the network system, receive an indication of a component failure, compute the availability of the network system, and/or store data indicative of the availability.

Program instructions configured to calculate the system availability and to store data indicative of the calculated system availability may be stored on any computer readable medium. In one embodiment, such program instructions may also be computer executable to calculate the risk of the network system being disrupted by computing the probability of the network system being disrupted during each of one or more exposure periods. Alternatively, the program instructions may be computer executable to calculate the risk of the network system being disrupted by computing the expected number of system failures per a given population for each of the exposure periods. The program instructions may also be computer executable to calculate the risk of the network system being disrupted by comparing the risk of the network system being disrupted for at least one of the one or more time periods to a threshold risk.

One embodiment of a method of operating a network system may involve receiving data indicating the configuration of components that are included in a network system, detecting a failure of one of the components, computing the availability of the network system from the data in response to detecting the failure, and storing data indicative of the availability of the network system.

BRIEF DESCRIPTION OF THE DRAWINGS

A better understanding of the present invention can be obtained when the following detailed description is considered in conjunction with the following drawings, in which:

FIGS. 5A-5C illustrate a reliability block diagram model of an embodiment of a network system and techniques for calculating the availability of the system.

FIG. 5D shows a fault tree model of an embodiment of a network system.

FIGS. 6A-6Q illustrate an exemplary availability calculation for one embodiment of a network system and illustrate various equations that may be used to evaluate the risk of system disruption during one or more exposure periods.

Figures 1, 1A:
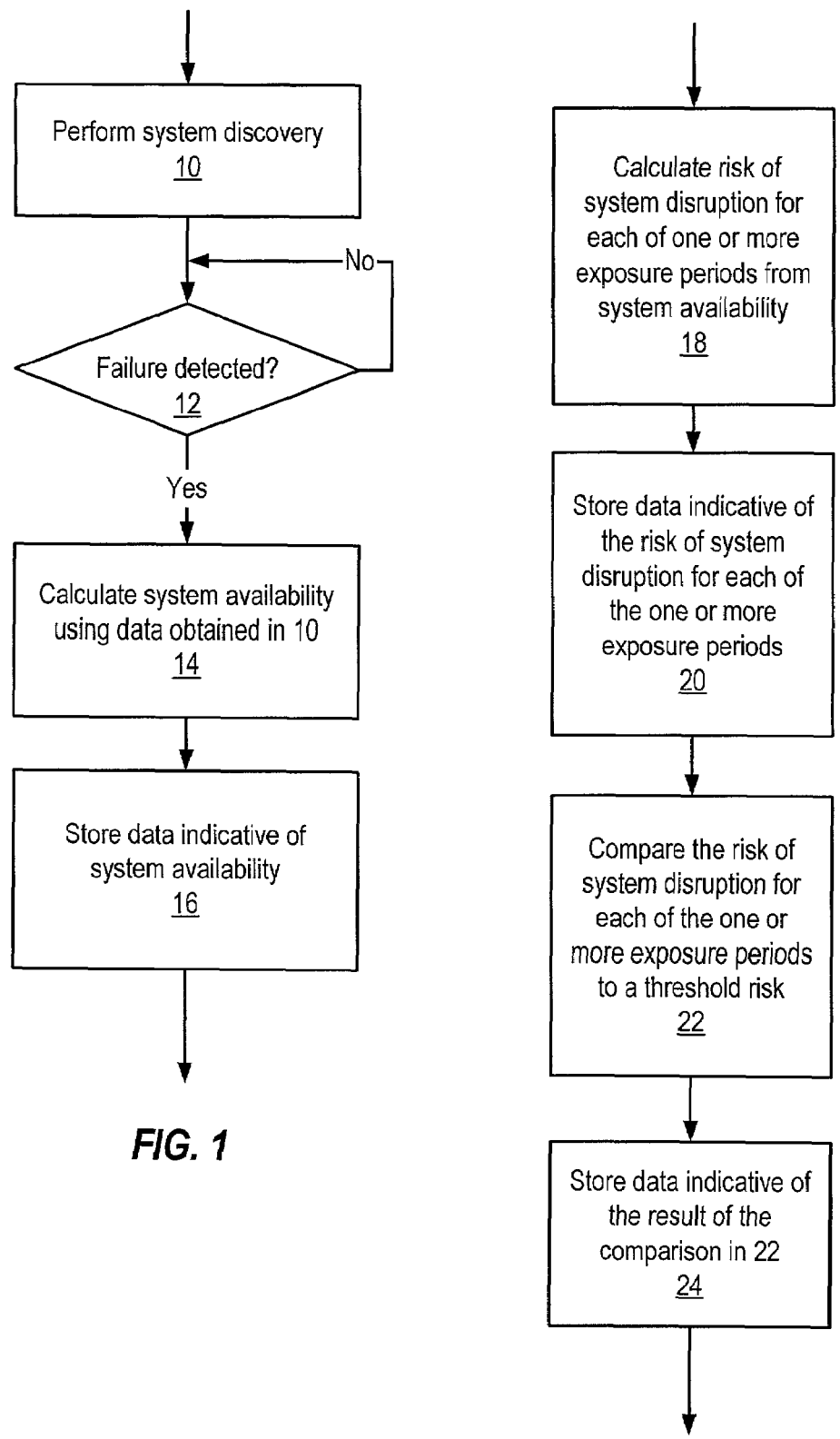
FIGS. 1 and 1A illustrate one embodiment of a method of calculating system availability.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

FIG. 1 shows one embodiment of a method of calculating the availability of a network system or subsystem. The availability calculation may determine the instantaneous availability of the network system. The instantaneous availability of a system is the probability that the system is available (i.e., in a state to perform a required function) under a given set of circumstances at a given time. In order to perform the availability calculation, system discovery is performed at 10. System discovery generates data indicative of the configuration of components included within a network system, as is described below. At 12, a component failure is detected. In response to detection of a component failure, the system availability (e.g., the instantaneous availability) is calculated, as shown at 14, using the data generated at 10. Data indicative of the system availability is stored, as indicated at 16.

FIG. 1A shows additional functions that may be performed in some embodiments of a method of calculating the availability of a network system. In some embodiments, the system availability may be used to determine the risk of the network system being disrupted during one or more exposure periods, as indicated at 18. At 20, data indicative of the risk of system disruption for each exposure period may be stored. An exposure period is a finite time period beginning after the component failure is detected. For example, an exposure period may be the time taken, on average, for a service technician to respond to a request to service the failed component. The risk of system failure during one or more of the exposure periods may be compared to a threshold risk, as shown at 22. Data indicative of the result of the comparison (e.g., data indicating that the risk during a particular exposure period is unacceptably high) may also be stored, as indicated at 24.

Returning to 10, performing system discovery involves determining the configuration of components that are included in a network system. The configuration of the components may indicate the fault-tolerant arrangement(s) of those components. For example, if a system includes redundant power supplies, system discovery may return data indicating the type, number, and fault-tolerant arrangement (e.g., how many power supplies out of the total number of power supplies need to be working in order to avoid system disruption) of the power supplies. In some embodiments, performing system discovery may involve gathering configuration-identifying data from components. The configuration identifying data may be used to access a lookup table or data file that indicates specifics about the physical configuration of each component. For example, a component's lookup table entry may indicate that the component is a disk drive in a storage array that stripes data and parity across eight disks, seven of which are required to be available in order for the storage array to be available, and that the storage array includes two hot spares (i.e., disks that may be switched into operation if one of the primary disks fails). Note that system discovery may be performed for one or more subsystems of a larger system. Also note that in some embodiments, all or some of system discovery may involve a user manually inputting configuration information.

In some embodiments, system discovery may involve one or more components determining the makeup and configuration of a network system by examining the interconnections between components. For example, each component may have a unique ID (e.g., a unique WWN (World Wide Name)) that identifies the vendor for and/or type(s) of device(s) included in the component. One or more components may query other components for their IDs in order to create a record of the components included in the system. The ways in which components are interconnected may also be determined through system discovery in some embodiments. The interconnection between components may indicate any fault tolerance (e.g., redundant links or redundant arrangements of components) built into the interconnect itself. Links between components may also be considered components. For example, if a link failure is detected, system availability may be recalculated to account for the link failure.

In one embodiment, automated topology discovery may be performed by one component sending a Request Node Identification Data (RNID) request to each component with which it is connected. As each component responds with its unique ID, the requesting component may store the returned IDs in a link table maintained by an agent (e.g., an SNMP (Simple Network Management Protocol) agent) in the requesting component. Each requesting component's link table may contain the IDs of every other component with which it is connected. Another network component (e.g., a server) may gather identifying information from the SNMP agents in each requesting component in order to determine the overall topology of the system. Alternatively, a single network component may send requests for identification data to each of the other network components in the system or subsystem for which system discovery is being performed.

As part of system discovery, a topology description of the network system may be written to a topology description data file. A graphical representation of the discovered topology may also be generated and provided to a user.

Returning to FIG. 1, the failure of a component in a network system may be detected, as indicated at 12. Failed components may be detected in many different ways. For example, one or more system agents (e.g., running on a host computer system and/or running on system components such as storage array controllers, network switches, etc.) may be configured to periodically poll components by sending that component data and seeing if the component returns the data. Another detection method involves monitoring a component's performance and comparing its performance to a threshold. Note that in some embodiments, a component may be considered "failed" if its performance drops below that threshold, even if the component is still somewhat functional. Also, some components may be configured to self-report failures (e.g., a hard drive may indicate that is a failed component if a certain number of and/or type of errors are reported internally). Components may also be configured to indicate that a neighboring component has failed (e.g., in response to sending several requests to a neighboring component and those requests timing out).

In response to detecting a failure, the system availability (which takes the failure into account) may be calculated from the system discovery data gathered through system discovery, as shown at 14. The availability calculation at 14 may be performed using a variety of different techniques, as described in more detail below. Note that if the failure is disruptive (e.g., the failure causes the network system to effectively become unavailable), the system availability calculation may not be performed and emergency service may be requested as soon as the disruption is detected.

The availability of the system may be used to calculate the risk of the system being disrupted during one or more exposure periods following the component failure, as shown at 18. In some embodiments, the risk may be evaluated as a probability of system disruption or as an expected number of system failures per a given population. In some embodiments, the risk of system disruption during a given exposure period may be compared to a threshold risk, as shown at 22. If the risk exceeds the acceptable risk, an indication may be stored, as shown at 24. The indication may also be provided to a user (e.g., the system availability agent may send an email indicating the risk to a system administrator). In some embodiments, the indication may include an indication of an acceptable exposure period (e.g., an exposure period in which the risk is less than the threshold risk).

Evaluating the risk of system disruption during one or more exposure periods after a component failure may provide a valuable system management tool. For example, if a component that is configured as part of a redundancy group (i.e., a fault-tolerant group of components) fails, its failure may not disrupt the system. However, if one or more other components in the redundancy group fail before the failed component is replaced or repaired, the system may be disrupted. A service technician or monitoring service may provide a user with one or more time estimates (e.g., a normal response time and an expedited response time) of how long it will take to send a technician to the customer's site to replace or repair the failed component. If the risk of the system being disrupted during an exposure period (e.g., the normal response time) is higher than desired, a user may request emergency service (e.g., if the risk of exposure during the expedited response time is acceptable) or call another service technician who can respond more quickly (e.g., if the risk during both response times is unacceptable). However, if there is an acceptable risk of system disruption during the estimated exposure period, a user may direct a service technician to proceed normally. Thus, knowing the availability of the system may allow a user to allocate resources in order to reduce the possibility of system disruption. Knowing the availability may also allow a user to select an exposure time that provides an acceptably low risk of system disruption. A user may also use the availability of the system to determine when to perform certain actions (e.g., to switch over to a redundant network if the network for which the availability was calculated is itself part of a redundancy group) and whether to provide any warnings of potential disruption to users of the network system.

In some embodiments, the system availability may be recalculated to account for each failed component if other component failures occur before the first failed component has been repaired. The risk of system disruption may also be reevaluated using the recalculated system availability in order to determine whether the risk has become unacceptably high due to the additional failures. Thus, some or all of blocks 12-24 may be repeated one or more times in some embodiments.

Note that while the functional blocks 10-16 and 18-24 are arranged in a certain order in the embodiment illustrated in FIG. 1, this arrangement is merely illustrative and does not imply that the method requires any particular temporal order. Other embodiments may use different arrangements of the functional blocks. Additionally, some embodiments may include fewer and/or additional functional blocks.

Figure 2:
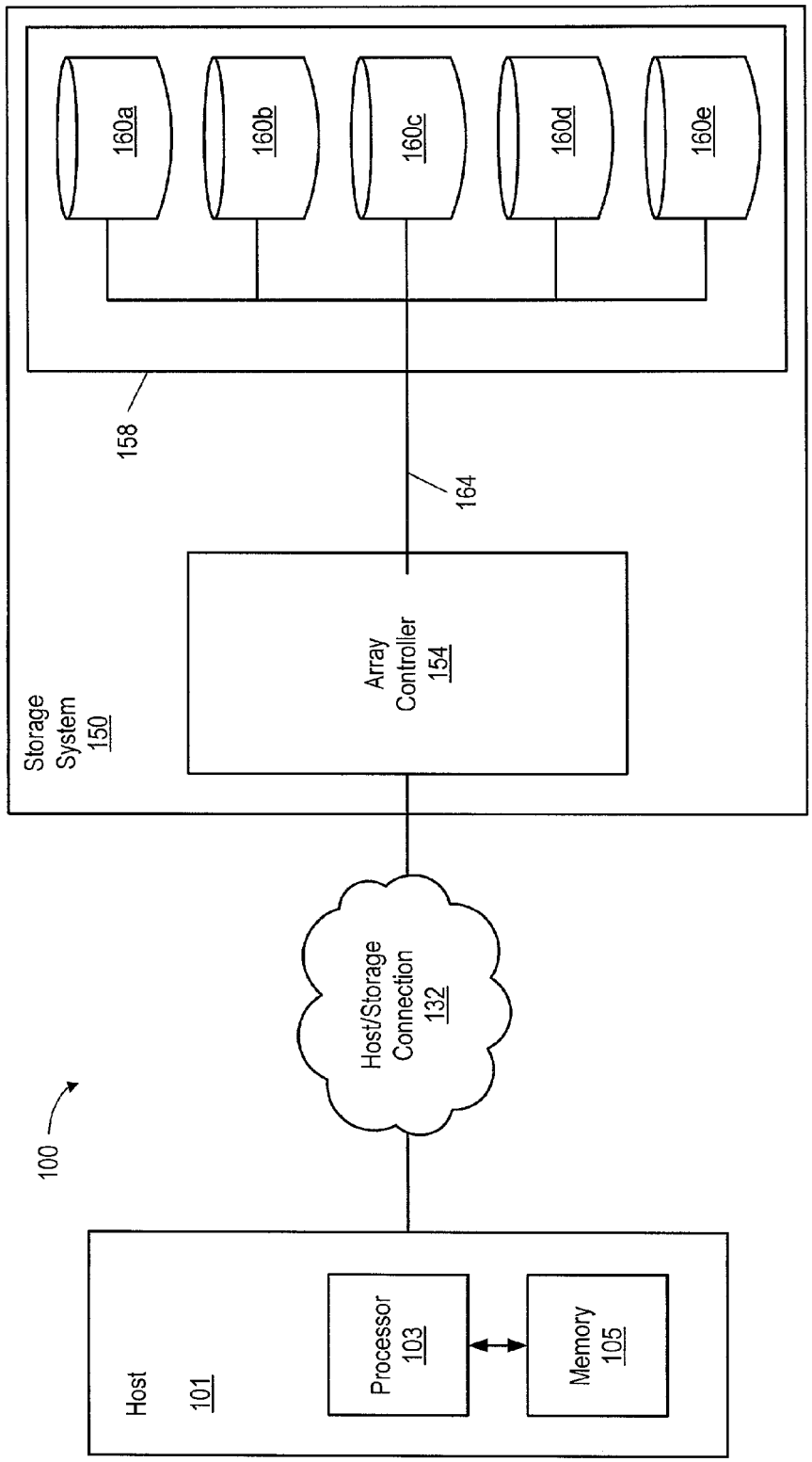
FIG. 2 shows a block diagram of one embodiment of a network system.

FIG. 2 shows a functional block diagram of one embodiment of a network system 100, which includes a host 101 connected to a storage system 150 via host/storage connection 132. Storage system 150 may be a RAID storage subsystem or other type of storage array. Network system 100 may be configured as a SAN (or as part of a SAN). In some embodiments, a plurality of hosts 101 may be in communication with a plurality of storage systems 150 via one or more host/storage connections 132. Host/storage connection 132 may be characterized by any of a variety of types of topology (i.e., the geometric arrangement of components in the network), of protocols (e.g., the rules and encoding specifications for sending data, and whether the network uses a peer-to-peer or client/server architecture), and of media (e.g., twisted-pair wire, coaxial cables, fiber optic cables, radio waves). Host/storage connection 132 may include several network switches. Network system 100 may also include other devices such as backup devices (e.g., tape drives).

Contained within storage system 150 is a storage array 158 that includes a plurality of storage devices 160a-160e (collectively referred to as storage devices 160). Storage devices 160a-160e may be, for example, magnetic hard disk drives, optical drives, magneto-optical drives, tape drives, solid state storage, or other non-volatile memory. As illustrated in FIG. 2, storage devices 160 are disk drives and storage array 158 is a disk drive array. Although FIG. 2 shows a storage array 158 having five storage devices 160a-160e, it is understood that the number of storage devices 160 in storage array 158 may vary and is not limiting.

Storage system 150 also includes an array controller 154 connected to each storage device 160 in storage array 158 via one or more data paths 164. Data path 164 may provide communication between array controller 154 and storage devices 160 using various communication protocols, such as, for example, SCSI (Small Computer System Interface), FC (Fibre Channel), FC-AL (Fibre Channel Arbitrated Loop), or IDE/ATA (Integrated Drive Electronics/Advanced Technology Attachment), etc.

Array controller 154 may take many forms, depending on the design of storage system 150. In some systems, array controller 154 may only provide simple I/O connectivity between host 101 and storage devices 160 and the array management may be performed by host 101. In other embodiments of storage system 150, such as controller-based RAID systems, array controller 154 may also include a volume manger to provide volume management, data redundancy, and file management services. In other embodiments of the present invention, the volume manager may reside elsewhere in data processing system 100. For example, in software RAID systems, the volume manager may reside on host 101 and be implemented in software. In other embodiments, the volume manager may be implemented in firmware that resides in a dedicated controller card on host 101. In some embodiments, array controller 154 may be connected to one or more of the storage devices 160. In yet other embodiments, a plurality of array controllers 154 may be provided in storage system 150 to provide for fault tolerance and/or performance improvements.

In one embodiment, a system discovery agent (e.g., executing on host 101 or array controller 154) may be configured to perform system discovery and to provide the system discovery data to a system availability agent (e.g., by creating a data file accessible by the system discovery agent or by passing a pointer to a data structure to the system discovery agent). A failure detection agent may be configured to detect a component failure. In one embodiment, the failure detection agent may be configured to poll the network at regular intervals in order to detect any component failures. Other embodiments may detect failures in other ways. For example, in some embodiments, failures may be detected by monitoring component performance and comparing performance to a threshold performance. If a replaceable or repairable component has failed and the failed component is not currently disrupting the system (e.g., the failed component is a redundant part with at least one operable spare), the failure detection agent may notify the system availability agent of the failure. In response to a component failure, the system availability agent may calculate the system availability using the system discovery data. The system availability agent may also calculate the risk of system disruption during one or more exposure periods following the component failure. These agents may be implemented by program instructions stored in memory 105 and executed by processor 103. Memory 105 may include random access memory (RAM) such as DRAM, SDRAM, DDR DRAM, RDRAM, etc. System availability, failure detection, and/or system discovery agents may also be running on other components in the computer system instead of or in addition to running on host 101. For example, one or more agents may be running on array controller 154 and/or on one or more network switches included in host/storage connection 132.

In some embodiments, all or some of the program instructions may be stored on one or more computer readable media (e.g., CD, DVD, hard disk, optical disk, tape device, floppy disk, etc.). In order to execute the instructions, the instructions may be loaded into system memory 105 (or into a memory included in one or more other network system components). In addition, the computer readable medium may be located in either a first computer, in which the software program is stored or executed, or in a second different computer, which connects to the first computer over a network such as the Internet. In the latter instance, the second computer may provide the program instructions to the first computer for execution. The instructions and/or data used to calculate the system availability may also be transferred upon a carrier medium. In some embodiments, the computer readable medium may be a carrier medium such as a network and/or a wireless link upon which signals such as electrical, electromagnetic, or digital signals may be conveyed.

A system availability agent may use many different techniques to calculate system availability. For example, a Monte Carlo methodology, a Markov chain model, a reliability block diagram, or a fault tree may be used to determine system availability in some embodiments. The method used to calculate system availability may be selected depending on, for example, the amount of time a particular method typically takes to calculate system availability for a given system configuration, computational resources required to implement a particular methodology, the accuracy of a given method, and so on.

The Monte Carlo method of determining system availability involves specifying failure rates and failure distributions for individual components. The failure rate, $\lambda$, of a component is proportional to the inverse of that component's MTBF (Mean Time Between Failures) and, for electrical components, is typically expressed as an average number of failures per million hours. For example, if an electrical component such as a power supply has a MTBF of 500,000 hours, that component's failure rate is two failures per million hours.

The failure distribution indicates what percentage of a particular type of component will fail before and after that component's MTBF. For example, some electrical components may have failure distributions such that approximately 63% will fail before the stated MTBF and 37% will fail after the stated MTBF. Different types of components have different failure distributions. For example, components with moving parts that are subject to wear may have significantly different failure distributions than components that do not have moving parts.

The failure rates for a new component (for which there is not any recorded field experience) may be calculated based on the factors such as the types of components included in the component and the anticipated operating conditions (e.g., temperature, humidity, etc.) of the component using standards such as those found in Military Handbook 217, which lists inherent failure rates for certain components. As an operator gains more experience with a particular component, this projected failure rate may be improved upon to reflect the component's actual performance.

Figure 3:
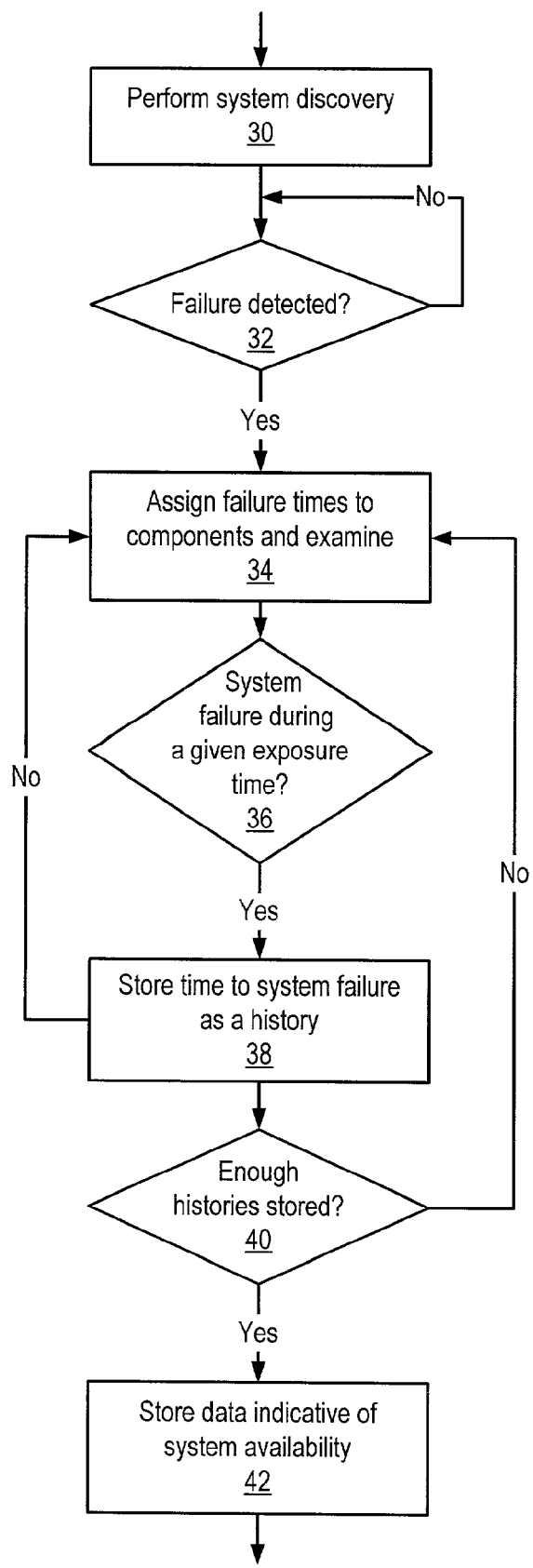
FIG. 3 shows a flowchart of one embodiment of a method of determining system availability using a Monte Carlo technique.

FIG. 3 illustrates one embodiment of a method of determining system availability using a Monte Carlo methodology. At 30, system discovery may provide the number of system components, as well as the number of component failures that will cause system failure and the failure distribution of each component (e.g., system discovery may involve detecting device IDs and using those IDs to access a table indicating the failure distributions of each device). In response to a component failure being detected, the system availability may be calculated using a Monte Carlo methodology, as indicated at 32. At 34, failure times are assigned to each component by randomly sampling that component's failure distribution (e.g., using a random number generator). The assigned failure times are then examined to determine whether, based on those failure times, enough components would fail during a given exposure time to cause system failure, as indicated at 34-36. At 38, if enough components failed to cause a system failure, the time to system failure is stored as a "history." The process repeats until a desired number (e.g., 1,000 to 10,000) of histories have been stored, as indicated at 40. The stored times to system failure may then be averaged and used to calculate the system availability. Data indicative of the system availability may then be stored, as indicated at 42.

A Markov chain model can be shown as a graphical representation of the possible states of a system and its components. These states are combined into a state transition matrix that includes transition failure rates or probabilities of a system transitioning from one state to another. This matrix may be solved for the expected time to system failure, which in turn may be used to calculate system availability.

Figures 4A, 4B, 4C, 4D:
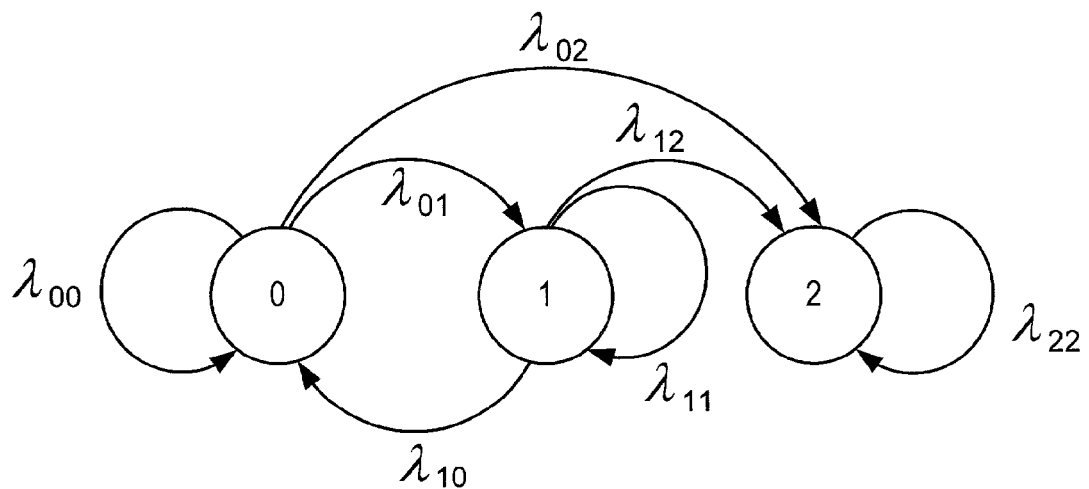
FIGS. 4A-4D illustrate a Markov chain model of an embodiment of a network system and techniques for calculating the availability of the system.

FIG. 4A shows an exemplary graphical representation of a system that may be used with an embodiment of Markov chain methodology. In this example, the system has three states. State 0 represents error-free operation. State 1 represents a correctable failure condition. State 2 represents an uncorrectable failure condition. The probability that the system will transition from state 0 to state 1 is given by the failure rate $\lambda_{01}$. The probability that the system will transition from state 0 to state 2 is given by the failure rate $\lambda_{02}$. The probability of the system remaining in state 0 is given by $\lambda_{00}$, and the probability of the system remaining in state 1 is given by $\lambda_{11}$. Since state 2 is an uncorrectable error condition, there is no probability of returning to states 0 or 1. Accordingly, $\lambda_{22}=1$, and $\lambda_{21}$ and $\lambda_{20}$ both equal zero. The transition failure rates for the three-state system are combined in the 3×3 matrix shown in FIG. 4B. Since $\lambda_{22}=1$, the bottom row of the matrix equals 0, 0, 1. The expected time to failure from state 0, $E_0$, may be derived from the matrix as shown in FIG. 4C. The system availability A may be calculated from $E_0$ as shown in FIG. 4D, where mean downtime (MDT) is the mean time to restore the system to state 0.

Since the matrix for an N-state system is N×N, the matrix dimensions for some systems may be undesirably complex or large. In order to simplify the Markov chain analysis, simplifying assumptions may be made to reduce the complexity of the resulting matrix. For example, a block of several components may be treated as a single component in order to reduce the complexity of the matrix.

Another technique for determining system availability uses a reliability block diagram of the network system. Reliability block diagrams represent the interconnections between components in a system. Redundant components are arranged in parallel with the other components in the same redundancy group. Components that are not redundant with that redundancy group are placed in series with it. FIG. 5A shows an example of a reliability block diagram for a relatively simple system. In this system, components B and C form a redundancy group. Accordingly, they are arranged in parallel with each other. The parallel combination of components B and C is placed in series with components D and E. The availability A of the system is determined by the availability of the components. Using each component's ID to represent the availability of that component, the availability A=BDE+CDE=DE(B+C). However, since only one of either B or C (but not both) needs to be available in order for the system to be available, the availability A may be further refined by subtracting out the probability of both B and C being available at the same time. Accordingly, the availability equation is A=DE(B+C−BC).

The availability $A_s$ of N components $A_i$ (where i=1 to N) in series is provided by the equation shown in FIG. 5B. An equation for the availability $A_s$ of modules in parallel is shown in FIG. 5C, where N is the number of parallel (i.e., redundant) modules and K is the number of those components that are required to be available in order for the system to be available. Note that the unavailability (i.e., failure) of any components will result in the availability of that component being zero.

The two equations in FIGS. 5B and 5C may be combined to represent different series-parallel combinations of components that may arise in a given system. The availability of a series of components, as shown in FIG. 5B, equals the product of each series component's availability. Combinations of parallel components may be treated as a single series component. Thus, the availability of the combination of parallel components may be calculated using the summation equation shown in FIG. 5C, and that availability may be combined with other availabilities using the equation of FIG. 5B.

Fault trees are similar to reliability block diagrams. FIG. 5D shows a fault tree representation of the same system represented in FIG. 5A. Components that are represented in series in a reliability block diagram are shown as inputs to an AND gate and components that are represented in parallel in a reliability block diagram are shown as inputs to an OR gate in a fault tree representation. The general equations shown in FIGS. 5B-5C may also be used in fault tree analysis.

Note that while several specific methods of calculating availability have been discussed above, other methods of calculating availability may be used in some embodiments.

As mentioned above, if a component fails, that component's availability will be equal to zero (i.e., that component is unavailable). Accordingly, if a block reliability model of the system has been derived from the system discovery data, the availability for the failed component may be set equal to zero in the equation and the system availability may be recalculated each time a component failure is detected. When a failed component is repaired or replaced, its availability may be reset to an appropriate non-zero value.

Once the availability of the system has been recalculated to account for a failed module, the risk of the system being disrupted within a given exposure period may be determined. For example, a system availability agent may maintain a list of the mean down time (MDT) or mean time to repair/replacement (MTTR) for each type of component. If a particular component fails, the system availability agent may determine the probability of the system failing during the MDT for the failed component. If the risk of system disruption occurring before the failed component is replaced is undesirably high, the system availability agent may generate an indication of this risk. The indication may include one or more notifications, such as an email to a system administrator or other person to alert that person to the risk of system disruption. Other notifications that may be generated include an email to a service technician or monitoring service indicating that emergency service is desired, an email to users indicating that copies of documents should be saved locally, etc.

Figures 6A, 6B, 6C, 6D:
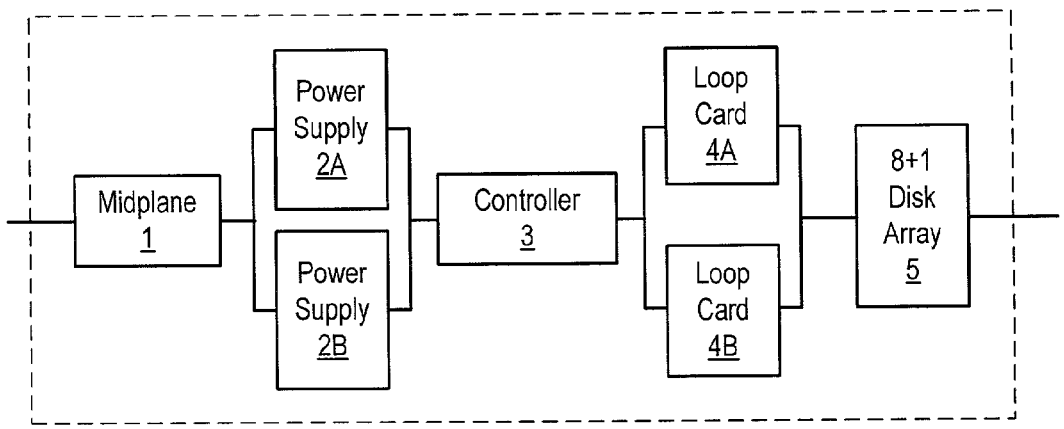

FIGS. 6A-6Q illustrate an exemplary availability calculation for the network system represented in FIG. 6A. FIG. 6A shows a reliability block diagram for an embodiment of a network storage system that includes a midplane 1, two redundant power supplies 2A and 2B (collectively, power supplies 2), a controller 3, two redundant loop cards 4A and 4B (collectively, loop cards 4), and an 8+1 disk array 5. Midplane 1 may be a circuit card with connectors (e.g., similar to a motherboard or back plane) that the disk drives in the 8+1 array 5 plug into in order to be coupled to a common data bus and/or to power supplies 2.

Power supplies 2 supply power to the system and are configured redundantly so that if one power supply fails, the other power supply may continue to provide power to the system. In some embodiments, when both power supplies are operational, both power supplies may operate to provide power to the system, allowing each to operate at a lower temperature than it would if it were singly powering the system.

Controller 3 controls disk array 5. For example, in one embodiment, controller 3 may be a RAID controller that controls how data being written to the disk array 5 is written to the individual disks.

In one embodiment, loop cards 4 may be fiber channel interfaces that convert electrical signals to light signals to be transmitted on a fiber optic line and/or convert light signals back into electrical signals (e.g., if disk array 5 is coupled in a Fibre Channel-Arbitrated Loop (FC-AL)).

Disk array 5 is an 8+1 disk array in the illustrated embodiment. The "8+1" notation provides the number of disks in the array (8+1=9) and describes the way that data is striped across the array. Each stripe of data is divided into eight units and each unit is written to a unique disk. A parity unit of data is calculated from those eight units and the parity unit is written to a ninth disk. Note that in some embodiments, parity units for different stripes of data may each be stored on different disks (e.g., as opposed to embodiments in which one of the disks is a dedicated parity disk). If one disk fails, the unit of data it was storing for a particular stripe may be recreated by calculating the parity of the remaining units of data (and/or the parity unit, if it was not stored on the failed disk) in the stripe. Thus, an 8+1 array includes nine disks and requires at least eight disks to be operational. Note that in some embodiments, additional "spare" disks may be included in an array (e.g., an 8+1+1 array may include a single spare disk). These spare disks may go unused until one of the other disks fails. Upon a failure, the spare disk may be called into service and the data stored on the failed disk may be recreated onto the spare disk. Thus, an 8+1+1 array may tolerate an additional disk failure before become unavailable.

In this example, each component 1-5 is a field replaceable unit (FRU) that may be removed and replaced by the user or a technician without having to send the entire component or system to a repair facility. The MTTR (Mean Time to Repair/Replace) each FRU is 0.5 hours for each component in this example. Furthermore, redundant components (e.g., power supplies 2, loop cards 4, and the disks in disk array 5) are assumed to have identical failure rates, MTTRs, and availabilities in this example.

FIG. 6B is a table showing exemplary failure rates (in failures/$10^6$ hours) for each of the individual components in FIG. 6A. Note that these failure rates are merely exemplary and are not necessarily indicative of actual failure rates in any particular embodiment. Each component's failures are assumed to be exponentially distributed in this example. Note that these assumptions are made in order to simplify the following example and may not be valid in some embodiments. For example, many components may not have exponentially distributed failure rates.

The failure rates shown in FIG. 6B may be used to calculate the availability for each individual component in the system shown in FIG. 6A. The equation shown in FIG. 6C may be used to calculate each component's availability. FIG. 6D shows an exemplary availability calculation for the midplane 1. FIG. 6E shows the availabilities of each of the individual components based on the failure rates shown in FIG. 6B.

The equations shown in FIGS. 5B and 5C may be used to calculate the availability of each component or redundant group of components. FIG. 6F shows how the availability of the redundant group 2 of two power supplies 2A and 2B may be calculated for i=K=1 to N=2, since there are 2 total components in the group and only one component needs to be available for the group to be available. If one of the power supplies (e.g., 2A) fails, the availability of group 2 may be calculated for i=K=1 to N=1, since there is now effectively only one component (e.g., 2B) in group 2. As FIG. 6G shows, the availability of a group with only one available component is approximately the same as the availability of the individual component.

Note that in some embodiments, the MTBF of a component in a redundant group may change if another component fails. For example, if the two power supplies are both operating to provide power to the system and one power supply fails, the remaining power supply may operate at a higher temperature than it operated at when both power supplies were in operation. Thus, symmetrically redundant components such as the power supplies in the above example may not have the same MTBF in some embodiments.

FIG. 6H shows the availability of each of the groups 1-5 in FIG. 6A. The availability of groups that have only one component (i.e., non-redundant groups) is equal to the availability of the individual component. The availability of redundant groups is calculated from equation 4C. FIG. 6H also shows the availability of each group after one component in that group fails. For non-redundant groups, the availability of that group will be zero (i.e., that group will be unavailable) if the non-redundant component in that group fails. In this example, each of the redundant groups can tolerate at most one failure before becoming unavailable (i.e., before that group's availability becomes zero).

The availability of the system shown in FIG. 6A may be calculated using the availability of each group, as shown in FIG. 6H, and the equation of FIG. 5B, as shown in FIG. 6J. FIG. 6K is a table showing the system availability after different component failures. Note that if a non-redundant component fails, or if more than one component in a redundant group fails (since in this example, each group only tolerates one failure), the network system will become unavailable.

Once the system availability is calculated to account for a component failure, the risk of the system being disrupted during various exposure periods may be evaluated. The risk of system disruption may be expressed in various ways, including the probability of system disruption and the expected number of system failures for a given number of systems (i.e., a given population).

FIG. 6L shows an equation for calculating the probability of system failure P(f) per an exposure period t (expressed in hours). In this equation, $\lambda$ is calculated from the system availability and the MTTR of the failed component(s), as shown in FIG. 6M. FIG. 6N is a table showing the P(f) for various failures during different exposure periods. For example, the probability a system that has experienced a single power supply failure will be disrupted during a 24-hour exposure period is 0.15%.

Another metric that may be used to evaluate the risk of system disruption during a given exposure period is the expected number of system failures for a given number of systems having the same availability during a given exposure period. FIG. 6P shows an equation for calculating the expected number of failures, where $\lambda$ is calculated using the equation of FIG. 6M. FIG. 6Q is a table showing the expected number of systems that would fail during a given exposure period in a 1000 system population.

Once a measurement of the risk of system disruption is calculated for an exposure period, an indication of this measurement may be provided to a user. In some embodiments, the availability agent may also be configured to analyze the likelihood of system disruption in order to determine whether to perform one or more other actions. For example, the availability agent may compare the likelihood of disruption to a threshold likelihood of disruption that indicates the highest acceptable likelihood of disruption. If the likelihood of disruption is unacceptably high, the availability agent may recalculate the likelihood of disruption for a shorter exposure period until an exposure period that provides an acceptably low risk is determined. In other embodiments, the availability agent may calculate several likelihoods of disruption for several exposure periods and compare each to the acceptable risk.

Numerous variations and modifications will become apparent to those skilled in the art once the above disclosure is fully appreciated. It is intended that the following claims be interpreted to embrace all such variations and modifications.

What is claimed is:

1. A system, comprising:
   a network system comprising a plurality of network components;
   a host computer system coupled to the network system, wherein the host computer system is configured to:
   perform system discovery to generate data indicative of a configuration of the plurality of network components;
   detect a failure of one of the components included in the plurality of network components;
   in response to identifying the failed component, update an availability of the network system using the data indicative of the configuration of the plurality of network components; and
   store data indicative of the availability of the network system.

2. The system of claim 1, wherein the host computer system is configured to use the updated availability to calculate a risk of the network system becoming unavailable during one or more exposure periods following the failure and prior to a repair or replacement of the failed component, and store data indicative of the risk.

3. The system of claim 2, wherein the data indicative of the risk includes data indicative of a probability of the network system becoming unavailable during each of the one or more exposure periods.

4. The system of claim 2, wherein the data indicative of the risk includes data indicative of an expected number of system failures per a given population for each of the one or more exposure periods.

5. The system of claim 2, wherein the host computer system is configured to:
compare the risk of the network system becoming unavailable for a first exposure period of the one or more exposure periods to a threshold value; and
if the risk is higher than the threshold value, determine an acceptable exposure period, wherein the risk of the network system becoming unavailable during the acceptable exposure period is lower than the threshold value, and provide an indication of the acceptable exposure period.

6. The system of claim 1, wherein the host computer system is configured to update the availability of the network system by calculating the instantaneous availability of the plurality of network components.

7. The system of claim 1, wherein said performing system discovery comprises:
sending a request for identification data to a particular network component of the plurality of network components; and
the particular network component returning a unique identifier in response to the request for identification.

8. The system of claim 1, wherein said detecting the failure comprises:
monitoring performance of the one of the components; and
determining that the one of the components has failed if the performance falls below a threshold.

9. A computer readable storage medium, storing program instructions computer executable to:
receive data indicating a configuration of components included in a network system;
receive an indication of a failure of one of the components in the network system;
compute an availability of the network system from the data in response to the failure of the one of the components, and
store availability data comprising data indicative of the availability of the network system.

10. The computer readable storage medium of claim 9, wherein the availability data comprises a table comprising one or more entries, wherein each entry in the table indicates a risk of the network system being disrupted during a respective exposure period following the failure and prior to a repair or replacement of the failed component, wherein the risk depends on the availability of the network system.

11. The computer readable storage medium of claim 10, wherein each entry in the table indicates a probability of the network system being disrupted during the respective exposure period.

12. The computer readable storage medium of claim 10, wherein each entry in the table indicates an expected number of system failures per a given population for the respective exposure period.

13. The computer readable storage medium of claim 10, wherein a first exposure period of the one or more exposure periods is an estimated time to replace the one of the components that failed.

14. The computer readable storage medium of claim 10, wherein the program instructions are computer executable to evaluate the risk of the network system being disrupted by comparing the risk of the network system being disrupted for at least one of the one or more exposure periods to a threshold risk.

15. The computer readable storage medium of claim 14, wherein the program instructions are computer executable to store an indication of an unacceptably high risk in response to the risk of the network system being disrupted for at least one of the one or more time periods being greater than the threshold risk.

16. The computer readable storage medium of claim 15, wherein the indication of the unacceptably high risk includes an indication of an acceptable exposure period.

17. The computer readable storage medium of claim 16, wherein the program instructions are computer executable to provide the acceptable exposure period to a monitoring service.

18. The computer readable storage medium of claim 9, wherein the program instructions are computer executable to calculate the availability using reliability block diagram analysis.

19. The computer readable storage of claim 9, wherein the program instructions are computer executable to calculate the availability using fault tree analysis.

20. The computer readable storage medium of claim 9, wherein the program instructions are computer executable to calculate the availability using Monte Carlo analysis.

21. The computer readable storage medium of claim 9, wherein the program instructions are computer executable to calculate the availability using Markov chain analysis.

22. The computer readable storage medium of claim 9, wherein the program instructions are computer executable to calculate the availability of a group of non-redundant components by multiplying individual availabilities of each non-redundant component in the group.

23. The computer readable storage medium of claim 22, wherein at least one of the non-redundant components includes a plurality of redundant components.

24. The computer readable storage medium of claim 9, wherein the program instructions are computer executable to compute the availability of the network system by computing the instantaneous availability of the network system.

25. A method of operating a network system, the method comprising:
receiving data indicating a configuration of components that are included in the network system;
detecting a failure of one of the components;
computing an availability of the network system from the data in response to said detecting; and
storing data indicative of the availability of the network system generated by said computing.

26. The method of claim 25, further comprising storing data indicative of a risk of the network system being disrupted during one or more exposure periods following the failure and prior to a repair or replacement of the failed component, wherein the risk depends on the availability of the network system.

27. The method of claim 26, wherein the data indicative of the risk includes data indicative of a probability of the network system being disrupted during each of the one or more exposure periods.

28. The method of claim 26, wherein the data indicative of the risk includes data indicative of an expected number of system failures per a given population for each of the one or more exposure periods.

29. The method of claim 26, further comprising comparing the risk of the network system being disrupted for at least one of the one or more exposure periods to a threshold risk.

30. The method of claim 29, further comprising storing an indication of an unacceptably high risk in response to the risk of the network system being disrupted for at least one of the one or more exposure periods being greater than the threshold risk.

31. The method of claim 30, wherein the indication comprises an indication of an acceptable exposure period.

32. The method of claim 31, further comprising providing the indication of the acceptable exposure period to a monitoring service.

33. The method of claim 26, wherein a first exposure period of the one or more exposure periods is an estimated time to replace the one of the components that failed.

34. The method of claim 25, wherein said computing comprises calculating the availability using reliability block diagram analysis.

35. The method of claim 25, wherein said computing comprises calculating the instantaneous availability of the network system.

36. A system comprising:
a network system comprising a plurality of components;
means for performing system discovery for the network system, wherein the means for performing system discovery generate data indicative of a configuration of the network system;
means for detecting a failure of one of the plurality of network components; and
means for calculating an availability of the network system from the data generated by the means for performing system discovery, wherein the means for calculating an availability calculate the availability in response to the means for detecting a failure detecting that a first one of the plurality of network components has failed, wherein the means for calculating the availability store data indicative of the availability of the network system.

37. A system, comprising:
a network system comprising a plurality of network components;
a first network device coupled to the network system, wherein the first network device includes a processor and a memory, wherein the first network device is configured to:
perform system discovery to generate data indicative of a configuration of the plurality of network components;
detect a failure of one of the components included in the plurality of network components;
in response to detecting the failure, calculate an availability of the network system using the data indicative of the configuration of the plurality of network components; and
store data indicative of the availability of the network system.

38. The system of claim 37, wherein the first network device is a host computer system.

39. The system of claim 37, wherein the first network device is an array controller.

40. The system of claim 37, wherein the first network device is a network switch.

* * * * *